US006580530B1

(12) United States Patent
Arecco et al.

(10) Patent No.: US 6,580,530 B1
(45) Date of Patent: Jun. 17, 2003

(54) OPTICAL COMMUNICATION SYSTEM

(75) Inventors: Fulvio Arecco, Monza (IT); Marcos Antonio Brandão Sanches, Lexington, SC (US); Francesca Loseto, Varese (IT); Piergiovanni Matrona, Milan (IT); Mario Tamburello, Vimercate (IT)

(73) Assignee: Cisco Photonics Italy S.r.L., Milan (IT)

( * ) Notice: Subject to any disclaimer, the term of this patent is extended or adjusted under 35 U.S.C. 154(b) by 0 days.

(21) Appl. No.: 09/321,850

(22) Filed: May 28, 1999

Related U.S. Application Data
(60) Provisional application No. 60/087,442, filed on Jun. 1, 1998.

(30) Foreign Application Priority Data

May 29, 1998 (EP) .............................. 98201797

(51) Int. Cl.⁷ .............................................. H04B 10/08
(52) U.S. Cl. ...................... 359/110; 359/119; 359/124; 359/133; 359/143; 359/177
(58) Field of Search ................................ 359/110, 124, 359/143, 177, 133, 119

(56) References Cited

U.S. PATENT DOCUMENTS

| 5,091,796 | A |   | 2/1992 | Nishimura et al. |
| 5,475,385 | A |   | 12/1995 | Pettitt et al. |
| 5,483,233 | A |   | 1/1996 | Pettitt et al. |
| 6,046,832 | A | * | 4/2000 | Fishman |
| 6,046,833 | A | * | 4/2000 | Sharma et al. |
| 6,081,359 | A | * | 6/2000 | Takehana et al. |
| 6,137,603 | A | * | 10/2000 | Henmi |
| 6,151,148 | A | * | 11/2000 | Harano |
| 6,154,296 | A | * | 11/2000 | Elahmadi et al. |

FOREIGN PATENT DOCUMENTS

| EP | 0 408 905 | 1/1991 |
| EP | 0 506 163 | 9/1992 |
| EP | 0 507 367 | 10/1992 |
| EP | 0 644 704 | 3/1995 |
| EP | 0 769 859 | 4/1997 |

OTHER PUBLICATIONS

H. Kleinmann et al., "Optische Betriebssysteme für den Weitverkehr", Ant Nachrichtentechnische Berichte, No. 3, pp. 95–112, (1986).

L. Bersiner et al., "Crossbar Structures of Integrated Optical Switching Arrays with Noninterferometric Switches", Proceedings of the European Conference on Optical Communication, vol. 2, No. CONF. 19, pp. 497–500, (1993).

Chung–Sheng Li et al., Automatic Fault Detection, Isolation, and Recovery in Transparent All–Optical Networks:, Journal of Lightwave Technology, vol. 15, No. 10., pp. 1784–1793, (1997).

* cited by examiner

Primary Examiner—Leslie Pascal
Assistant Examiner—Dzung Tran
(74) Attorney, Agent, or Firm—Baker Botts L.L.P.

(57) ABSTRACT

An optical communication system for communicating at least a first optical system. The optical communication system includes a first primary guided optical path and a first secondary guided optical path, through each of which the first optical signal is configured to propagate. A first primary optical amplifier is provided in the first primary guided optical path and is configured to transmit an overmodulation frequency of the first optical signal. A first secondary optical amplifier is provided in the first secondary guided optical path and is configured to transmit the overmodulation frequency of the first optical signal. A controller controls propagation of the first optical signal from the first primary guided optical path to the first secondary guided optical path based on the detected presence of the overmodulation frequency.

20 Claims, 5 Drawing Sheets

OPTICAL COMMUNICATION SYSTEM

CROSS-REFERENCED TO RELATED APPLICATIONS

This application is based on European Patent Application No. 98201797.2 filed on May 29, 1998 and U.S. Provisional Application No. 60/087,442 filed on Jun. 1, 1998, the content of which is incorporated hereinto by reference.

BACKGROUND OF THE INVENTION

The present invention relates to an optical communication system comprising a transmission switching system.

More particularly, the present invention relates to a system and a method of transmission switching for an optical communication system comprising at least a first primary guided optical path for the transmission of at least one optical signal and at least a first secondary guided optical path to which the transmission of the optical signal can be switched in case of degradation of the transmission in the first primary guided optical path.

DISCUSSION OF THE BACKGROUND

In the operation of optical communication systems there is a widely felt need to minimize the problems which arise when there is a deterioration of transmission due, for example, to a fault of a device in a guided optical path (e.g. an optical amplifier) and/or of a device in a terminal station (e.g. a transmitter or receiver) and/or to the breaking of an optical cable.

Among the operating systems for optical communication systems, there are known remote monitoring systems for detecting and locating the presence of a fault in the system.

EP 0 408 905 describes an optical fibre telecommunications line comprising active optical fibre amplifiers. Each active optical fibre present in the amplifiers is connected to two laser sources of optical pumping radiation. The first of these two laser sources of optical pumping radiation is put into operation and the second is kept in reserve so that it can be put into operation when the first becomes faulty. The two sources of optical pumping radiation are also connected to a microprocessor circuit capable of commanding them to send alarm signals on the state of the amplifier to the terminal stations of the line and to receive from these stations control signals for switching operation between the two sources of optical pumping radiation.

U.S. Pat. No. 5,475,385 describes a telemetry system for locating a fault in an optical transmission system including optical fibre amplifiers. Each amplifier has a corresponding source of pumping radiation comprising a loop system, for automatic gain control, around the fibre of the optical amplifier. The spontaneous emission of each amplifier is detected and used to control the corresponding source of pumping radiation and to maintain the output of the amplifier at a predetermined level. The transmitter of the system injects a monitoring tone whose presence or absence is detected by each amplifier. If there is a fault in the transmission line, the down-line amplifiers, not receiving the said monitoring tone, inject a corresponding alarm tone. In reception, suitable devices detect the presence or absence of the monitoring tone and, in its absence, count the number of alarm tones, if they are present, thus determining the position of the fault. The absence of the monitoring tone and of the alarm tones indicates that the fault has occurred between the last amplifier and the receiving station.

U.S. Pat. No. 5,483,233 also describes a telemetry system for locating a fault in an optical transmission system including optical fibre amplifiers. Each amplifier comprises an active optical fibre with a loop system for automatic gain control (AGC) around it. In the AGC the spontaneous emission from the amplifier fibre is detected and used to control the source of pumping radiation in such a way as to maintain the output of the amplifier at a predetermined level. A monitoring tone is injected by the transmission unit of the system. Each amplifier detects the presence of the monitoring tone or of an alarm tone originating from the preceding amplifier. If one of the tones is detected, the signal is amplified and transmitted to the next amplifier. If no tone is detected, an alarm tone corresponding to the amplifier tone is injected into the corresponding pumping source. At the receiving unit of the system, the presence or absence of the monitoring tone, and in its absence the presence or absence of an alarm tone, is detected. The position of a fault in the system is determined from this information.

EP 0506163 describes an optical fibre telecommunications line, comprising two terminal stations, each having a transmitter of optical signals and a receiver connected operationally by an automatic protective device capable of switching off the transmitter in the absence of a received optical signal, and corresponding optical fibre lines connecting the transmitter of one station to the receiver of the other station and including at least one optical amplifier. At least one of the optical amplifiers has a protective device comprising means of detecting the presence of an optical signal at the output of the amplifier. The interruption of light emission in the down-line direction causes the interruption of emission in the whole line by the intervention of the automatic protective device of the terminal stations.

EP 0507367 describes an optical fibre telecommunications system comprising at least one amplifier with an active fibre having a fluorescent element and a laser pump for supplying light energy to the active fibre. Detection means for detecting the presence of light energy are connected to the input of the active fibre. In the absence of light energy at the input of the active fibre, control means are put into operation by the said detecting means to interrupt the pump source in order to interrupt substantially any emission of light energy from the optical amplifier.

In addition to remote monitoring systems for detecting and locating the presence of a fault in the system, there are known remote operating systems for switching, in case of a fault, the transmission of an optical signal, at a predetermined frequency, from a first guided optical path to a second guided optical path.

U.S. Pat. No. 5,091,796 describes a communication system comprising a plurality of stations, a first active line (guided optical path) which connects adjacent stations of a plurality of stations, a second active line which by-passes predetermined stations without "dropping" into them, and a third line for protection, in common between the first active line and the second active line. A monitoring signal travels continuously along the protection line. Each station includes an internal circuit for receiving an input transmission signal from the first active line and for sending an output transmission signal along this line. Each station also includes a switching section for the passage of the protection line without allowing it to drop into each station in normal conditions, and for connecting, in alarm conditions, the protection line to the internal circuit so that the input transmission signal is received by the protection line up-line instead of by the first active line, so that the protection line up-line from the station is used, instead of the first active line in which, for example, a fault has occurred. Additionally, the monitoring signal, which is generated by the output transmission signal, is sent, down-line, through the protection line.

In the said known systems, a degradation of transmission is dealt with at the transmitting and receiving stations and also at intermediate stations or optical amplifiers along a guided optical path. These therefore require a single operating system which is perfectly compatible with the guided optical path and with the transmitting and receiving terminal stations which must, therefore, communicate with each other.

The inventors have perceived that, in practice, the manufacturers of terminal stations are frequently different from the manufacturers of guided optical paths, comprising optical cables and optical amplifiers or intermediate stations. The said conventional systems therefore require, at the time of assembly of an optical communication system, a laborious process of adaptation for making the terminal stations compatible (communicating) with the guided optical path.

The inventors have also perceived that, in the said conventional operating systems, in the case of a multiple-wavelength transmission in a single guided optical path, when a fault occurs along the guided optical path and it is therefore necessary to switch the transmission of all the transmitted wavelengths to another guided optical path, the switching should be controlled by as many terminals as there are wavelengths transmitted. Each terminal should therefore check for the presence of any faults in the guided optical transmission path and, if necessary, switch the transmission of the corresponding wavelength. This would require a transmission switching system which is complex and consequently expensive and unreliable.

In the particular case of loop networks provided with a plurality of nodes, it has been proposed to provide an additional protection ring (closed optical path) and to propagate an optical signal simultaneously in both loops in two different directions of propagation.

EP 0769859 describes a fail-safe loop optical communication network comprising a first optical communication line, forming a closed optical path; at least two nodes for injection and extraction of optical signals connected optically along the line; a second optical communication line, forming a closed optical path and connected optically to the nodes for injection and extraction of optical signals. In the network there are defined a first and a second direction, opposite to each other, of travel of the optical signals with respect to the position of the nodes for injection and extraction of optical signals. At least one of the said nodes also comprises selection means, controlled by the optical signals, for the selective extraction of the optical signals from one of the communication lines. At least one of the nodes for injection and extraction of optical signals also comprises means for the simultaneous injection of at least one optical signal in the first direction along the first communication line and in the second direction along the second communication line.

SUMMARY OF THE INVENTION

The object of the present invention is to overcome the aforesaid disadvantages of the conventional operating systems. This is achieved by means of an optical communication system comprising a transmission switching system which is universal and independent of the transmitting and receiving terminal stations.

In a first aspect, the present invention provides therefore an optical communication system comprising:

a first transmitter;
a first receiver;
a first primary guided optical path having a protected portion;
a first secondary guided optical path;
at least an optical amplifier;
a modulation device, up-line from the said protected portion of the said first primary guided optical path, for transmitting a first overmodulation frequency along the said protected portion;
a detection device, down-line from the said protected portion of the said first primary guided optical path, for detecting the presence or absence of the said first overmodulation frequency; and
an operating device, down-line from the said protected portion of the said first primary guided optical path, connected operationally to the said first secondary guided optical path;
the said first transmitter sending at least one optical signal at least along the said first primary guided optical path and the said first receiver receiving the said at least one optical signal, in which, when the said detection device detects the absence of the said first overmodulation frequency in the said protected portion of the said first primary guided optical path, the said operating device enables the said optical signal to be propagated along the said first secondary guided optical path up to the said first receiver.

In the present description and in the attached claims, the expression "guided optical path" is used to mean a path which physically connects separate points of a system and/or of an optical communication network, and which is capable of transferring an optical signal in a guided way from one to another of the said points. This path may comprise optical waveguides such as optical fibres and optical amplifiers, of the doped fibre type for example.

The expression "protected portion" is used to mean any section of a guided optical path which is to be protected against any fault in the said guided optical path.

Preferably said protected portion is comprised between a WDM multiplexer and a WDM demultiplexer.

Typically, said WDM multiplexer is located up-line from said modulation device.

Typically, said WDM demultiplexer is located down-line from said detection device.

In one embodiment, the said at least one optical signal is also sent along the said first secondary guided optical path and, when the said detection device detects the presence of the said first overmodulation frequency in the said protected portion of the said first primary guided optical path, the propagation of the said optical signal along the said first secondary guided optical path is blocked before the said first receiver.

In another embodiment, the said optical communication system also comprises a second primary guided optical path having a protected portion, a second transmitter for sending at least one second optical signal at least along the said second primary guided optical path, and a second receiver for receiving the said at least one second optical signal.

Preferably, the said second primary guided optical path is operationally connected to the said first primary guided optical path.

Advantageously, the said at least one second optical signal has a propagation direction opposite that of the said at least one optical signal.

Preferably, the optical communication system also comprises a second secondary guided optical path, connected operationally to the said second primary guided optical path.

More preferably, the said second secondary guided optical path is also operationally connected to the said first secondary guided optical path.

In a first embodiment, the said first primary guided optical path and the said first secondary guided optical path are connected by a first beam splitter up-line from the said protected portion of the said first primary guided optical path.

In a second embodiment, the said first primary guided optical path and the said first secondary guided optical path are connected by a first coupler down-line from the said protected portion of the said first primary guided optical path.

In a third embodiment, the said second primary guided optical path and the said second secondary guided optical path are connected by a second beam splitter up-line from the said protected portion of the said second primary guided optical path.

In a fourth embodiment, the said second primary guided optical path and the said second secondary guided optical path are connected by a second coupler down-line from the said protected portion of the said second primary guided optical path.

In a fifth embodiment, the said first primary guided optical path and the said first secondary guided optical path are associated with a first switch up-line from the said protected portion of the said first primary guided optical path.

In a sixth embodiment, the said first primary guided optical path and the said first secondary guided optical path are associated with a second switch down-line from the said protected portion of the said first primary guided optical path.

In a seventh embodiment, the said second primary guided optical path and the said second secondary guided optical path are associated with a third switch up-line from the said protected portion of the said second primary guided optical path.

In an eighth embodiment, the said second primary guided optical path and the said second secondary guided optical path are associated with a fourth switch down-line from the said protected portion of the said second primary guided optical path.

Advantageously, at least one of the said first and second primary guided optical paths comprises, in transmission, an optical transmission amplifier.

Preferably, at least one of the said first and second secondary guided optical paths comprises, in transmission, an optical transmission amplifier.

More preferably, at least one of the said first and second primary guided optical paths comprises, in reception, an optical receiving amplifier.

Even more preferably, at least one of the said first and second secondary guided optical paths comprises, in reception, an optical receiving amplifier.

Typically, the said modulation device comprises a modulator associated with each of the said first and second primary guided optical paths to generate the said first overmodulation frequency along the said first and the said second primary guided optical path. Advantageously, the said modulator is associated with the optical transmission amplifier of the said first and second primary guided optical paths.

Preferably, the said detection device is associated with each of the said first and second primary guided optical paths to detect the presence or absence of the said first overmodulation frequency along the said first and second primary guided optical paths. More preferably, the said detection device is associated with the optical receiving amplifier of the said first and second primary guided optical paths.

Advantageously, the said operating device comprises an electronic circuit associated with each of the said first and second primary guided optical paths to switch the transmission of at least one of the said first and second optical signals according to the presence or absence of the said first overmodulation frequency in the said first and second primary guided optical paths. Preferably, the said operating device is associated with the optical receiving amplifier of the said first and second primary guided optical paths.

In one embodiment, the said optical communication system comprises a first plurality of transmitters for sending in the said first primary guided optical path a plurality of optical signals, each having a different wavelength from the other optical signals.

In a variant, the said optical communication system also comprises a second plurality of transmitters for sending in the said second primary guided optical path a plurality of optical signals, each having a different wavelength from the other optical signals.

In another embodiment, the said modulation device also comprises a modulator associated with each of the said first and second secondary guided optical paths to generate a second overmodulation frequency along the said first and second secondary guided optical paths.

Preferably, the said detection device is also associated with each of the said first and second secondary guided optical paths to detect the presence or absence of the said second overmodulation frequency along the said first and second secondary guided optical paths.

A second aspect of the present invention is a method for switching the transmission of an optical signal from a primary guided optical path to a secondary guided optical path, comprising the phases of:

a) sending at least a first part of the power of the said optical signal in the said primary guided optical path;

b) sending an overmodulation frequency in the said primary guided optical path;

c) detecting the presence or absence of the said overmodulation frequency in the said primary guided optical path;

d) allowing the propagation of the said optical signal along the said secondary guided optical path when the absence of the said overmodulation frequency is detected.

In one embodiment, the phase a) also comprises the sending of a second part of the power of the said optical signal in the said secondary guided optical path, and the said method also comprises a phase e) in which the propagation of the said optical signal in the said secondary guided optical path is blocked when the presence of the said overmodulation frequency is detected in the said primary guided optical path.

In one variant, at least the said secondary guided optical path comprises an optical receiving amplifier. Preferably the phase e) is executed by disabling the said optical receiving amplifier. Advantageously, the phase d) is executed by activating the said optical receiving amplifier.

In another variant, the said primary guided optical path and the said secondary guided optical path are associated with a switch. Preferably, the phase e) is executed by closing the said switch on the said primary guided optical path. Advantageously, the phase d) is executed by closing the said switch on the said secondary guided optical path.

BRIEF DESCRIPTION OF THE DRAWINGS

Characteristics advantages of the invention will now be illustrated with reference to embodiments represented by way of example, without restriction, in the attached drawings, in which.

DESCRIPTION FOR THE PREFERRED EMBODIMENTS

Figure 1:
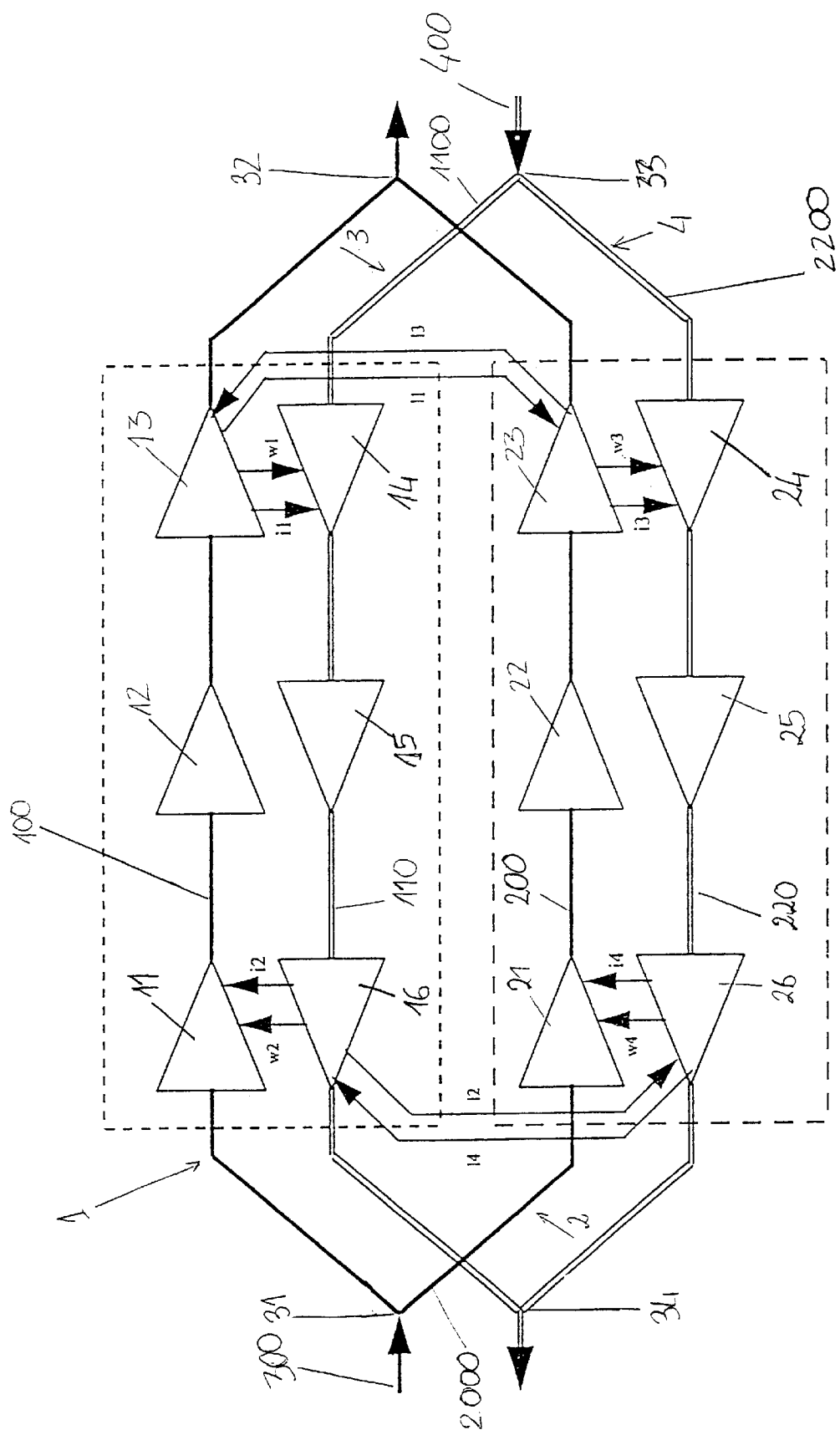
FIG. 1 is a schematic representation of a first embodiment of a transmission switching system according to the invention.

FIG. 1 shows a first embodiment of a transmission switching system for a bidirectional optical communication system according to the invention. The said transmission switching system comprises a first and a second primary (master) guided optical path 1 and 3 along which an outgoing transmitting apparatus and a return apparatus (not shown) transmit, respectively, an outgoing optical signal 300 and a return optical signal 400. The said outgoing and return optical signals are characterized by one or a plurality of carrier wavelengths and are modulated at the frequency of an electrical signal containing the information to be transmitted. In the case of a digital electrical signal, this modulation frequency corresponds to the transmission bit rate. In the case of a plurality of carrier wavelengths, a WDM multiplexer is provided to combine the plurality of modulated wavelengths into a signal. The transmission switching system also comprises a first and a second secondary (slave) guided optical path 2 and 4, to which the transmission of the said outgoing optical signal 300 and of the said return optical signal 400, respectively, is switched, if the presence of a fault is detected along one of the two primary guided optical paths 1 and 3.

The said first and second primary guided optical paths 1 and 3 comprise, respectively, a first and a second primary optical transmission amplifier 11 and 14 and a first and a second primary optical receiving amplifier 13 and 16, connected, respectively, by a first and a second primary optical fibre cable 100 and 110. Typically, the said first and second primary guided optical paths 1 and 3 also comprise a certain number of optical amplifiers disposed along the said first and second primary optical fibre cables 100 and 110. In the embodiment shown in FIG. 1, there is a primary optical amplifier, 12 and 15, along each of the said primary optical fibre cables 100 and 110 respectively.

In turn, the said first and second secondary guided optical paths 2 and 4 comprise, respectively, a first and a second secondary optical transmission amplifier 21 and 24 and a first and a second secondary optical receiving amplifier 23 and 26, connected, respectively, by a first and a second secondary optical fibre cable 200 and 220. Typically, the said first and second secondary guided optical paths 2 and 4 also comprise a certain number of optical amplifiers disposed along the said first and second secondary optical fibre cables 200 and 220. In the embodiment shown in FIG. 1, there is a secondary optical amplifier, 22 and 25, also along each of the said first and second secondary optical fibre cables 200 and 220 respectively.

Preferably, the said first and second secondary guided optical paths 2 and 4 have the same number of optical amplifiers as the said first and second primary guided optical paths 1 and 3.

A first beam splitter 31 divides the power of the said outgoing optical signal 300 into two substantially equal parts, transmitting it both in the said primary guided optical path 1 and in the said secondary guided optical path 2. The power level of the said outgoing optical signal 300 at the input is regulated in the transmitting apparatus in such a way as to allow for the attenuation of 3 dB caused by the said first beam splitter 31. A first coupler 32 then combines the outputs of the said primary guided optical path 1 and of the said secondary guided optical path 2.

A receiver is located down-line from said first coupler 32. In the case of a plurality of carrier wavelengths, a WDM demultiplexer is provided to separate the signal into a plurality of modulated wavelengths to be sent to respective receivers.

In turn, a second beam splitter 33 divides the power of the said return optical signal 400 into two substantially equal parts, transmitting it both in the said second primary guided optical path 3 and in the said second secondary guided optical path 4. The power level of the said return optical signal 400 at the input is also regulated in the return transmitting apparatus in such a way as to allow for the attenuation of 3 dB caused by the said second beam splitter 33. A second coupler 34 then combines the outputs of the said second primary guided optical path 3 and of the said second secondary guided optical path 4.

A receiver is located down-line from said second coupler 34. In the case of a plurality of carrier wavelengths, a WDM demultiplexer is provided to separate the signal into a plurality of modulated wavelengths to be sent to respective receivers.

The said optical amplifiers 11–16 and 21–26 are, preferably, optical amplifiers based on suitably doped active fibres, pumped by a first source of optical pumping radiation, for example a laser or a laser diode. In one variant, the said optical amplifiers 11–16 and 21–26 also comprise a second reserve source of optical pumping radiation which is put into operation in case of a fault or degradation of performance of the first. Alternatively, when a greater pumping power is required, the said second source of optical pumping radiation operates together with the first.

Typically, the said active fibre is doped with erbium. The wavelength of the said optical pumping radiation is selected from the absorption wavelengths of the dopant used for the active fibre of the optical amplifier. In the case of erbium, the said wavelength of the said optical pumping radiation is preferably approximately 1480 nm and/or approximately 980 nm.

The said first and second primary optical transmission amplifiers 11 and 14 and the said first and second secondary optical transmission amplifiers 21 and 24 are associated with a modulator which is operated to modulate, at a first predetermined modulation frequency, the supply current of the said source of optical pumping radiation. The modulation of the said supply current is thus transferred to the optical pumping radiation and, therefore, to the inversion of the population of the dopant used in the primary optical transmission amplifiers 11 and 14 and in the secondary optical transmission amplifiers 21 and 24. In this way, the said optical transmission amplifiers 11, 14, 21 and 24 transmit, at a predetermined command, a first overmodulation frequency (tone) of the said optical signals 300 and 400 along the said primary guided optical paths 1 and 3 or along the said secondary guided optical paths 2 and 4.

In one variant, a modulator modulates the said optical pumping radiation at the output of the said source by an external modulation carried out, for example, by means of a conventional electro-optical or acousto-optical modulator. In a further variant, a conventional optical modulator is associated with the said optical transmission amplifiers 11, 14, 21 and 24 (for example, down-line or, more preferably, up-line from them) in such a way as to supply a modulation at the said first overmodulation frequency to the outgoing and return optical signals 300 and 400.

To prevent the introduction of noise into the transmission band of the said optical signals 300 and 400, the said first overmodulation frequency is preferably outside the said transmission band. Additionally, owing to the response times of the dopant of the active fibre of the said optical transmission amplifiers 11, 14, 21 and 24, the said first overmodulation frequency is greater than a predetermined value. In the case of erbium as the active dopant, the said first overmodulation frequency is preferably in the range from 3 to 100 kHz. More preferably it is in the range from approximately 5 to 50 kHz. Even more preferably it is in the range from 5 to 20 kHz.

Each of the said first and second primary optical receiving amplifiers 13 and 16 and each of the said first and second secondary optical receiving amplifiers 23 and 26 is associated with a device of the conventional type for detecting the presence or absence of the said first overmodulation frequency. The said device may, for example, comprise an opto-electronic receiver (e.g. a photodiode), a filter capable of selecting the said first predetermined overmodulation frequency, a conventional peak detector and a conventional comparator circuit (not shown).

The said device is preferably arranged up-line from the said optical receiving amplifiers 13, 16, 23 and 26. The said filter is a conventional electronic filter located after the opto-electronic receiver. At the output of the said peak detector, the said comparator circuit compares the received and filtered signal with a predetermined threshold to determine the presence or absence of the said first overmodulation frequency (tone).

Each of the said first and second primary optical receiving amplifiers 13 and 16 and of the said first and second secondary optical receiving amplifiers 23 and 26 is also associated with an electronic device for transmitting suitable operating signals ($l_j$, $w_j$, $i_j$) for carrying out, as will be explained below, the transmission switching in the presence of a fault in a guided optical path or of degradation in the performance of an optical amplifier or an optical fibre cable (i.e. when the absence of the said first overmodulation frequency is detected). The said electronic operating device is a conventional digital circuit.

In normal operating conditions of the bidirectional optical communication system, the said outgoing optical signal 300 is transmitted to the input of the said first beam splitter 31;
the said return optical signal 400 is transmitted to the input of the said second beam splitter 33;
the said source of optical pumping radiation of the said optical amplifiers 11–16 and 21, 22, 24 and 25 along the said primary and secondary guided optical paths 1–4 is switched on;
the said source of optical pumping radiation of the said secondary optical receiving amplifiers 23 and 26 is switched off;

the said modulator of the said source of optical pumping radiation of the said first and second primary optical transmission amplifiers 11 and 14 is active;
the said modulator of the said source of optical pumping radiation of the said first and second secondary optical transmission amplifiers 21 and 24 is disabled.

Consequently, the said optical signals 300 and 400 are actually transmitted only along the said primary guided optical paths 1 and 3, because the said source of optical pumping radiation of the said secondary optical receiving amplifiers 23 and 26 is not switched on and therefore prevents the said optical signals 300 and 400, transmitted by the said beam splitters 31 and 33 both along the said primary guided optical paths 1 and 3 and also along the said secondary guided optical paths 2 and 4, from being recombined, by the said couplers 32 and 34, at the output of the said switching system;
the said first overmodulation frequency (tone) is present only along the said primary guided optical paths 1 and 3, because the said modulator of the said secondary optical transmission amplifiers 21 and 24 is disabled.

In case of a fault in one (or both) of the said first and second primary guided optical paths 1 and 3, the detection of the absence of the said first overmodulation frequency by one (or both) of the said primary optical receiving amplifiers 13 and 16 causes the transmission of the said optical signals 300 and 400 to be switched immediately to the said first and second secondary guided optical paths 2 and 4 respectively.

For example, in case of a break in the said first primary optical fibre cable 100, the said first primary optical receiving amplifier 13 detects, by means of the said opto-electronic receiver, filter, peak detector and comparator circuit, the absence, down-line from the break, of the said first overmodulation frequency in the said first primary optical path 1. Consequently, the said operating device of the said first primary optical receiving amplifier 13 switches off its source of optical pumping radiation and sends the following:

a first digital operating signal $w_1$ to the said second primary optical transmission amplifier 14, to disable the modulator of its source of optical pumping radiation;
a second digital operating signal $i_1$ to the said second primary optical transmission amplifier 14, to disable its source of optical pumping radiation;
a third digital operating signal $l_1$, to the said first secondary optical receiving amplifier 23, to activate its source of optical pumping radiation.

In turn, since the said primary optical transmission amplifier 14 no longer transmits the said first overmodulation frequency, the said second primary optical receiving amplifier 16 detects the absence of the said first overmodulation frequency in the said second primary optical path 3. Consequently, the said operating device associated with the said second primary optical receiving amplifier 16 switches off the source of optical pumping radiation of the latter and sends the following:

a first digital operating signal $w_2$ to the said first primary optical transmission amplifier 11, to disable the modulator of its source of optical pumping radiation;
a second digital operating signal $i_2$ to the said first primary optical transmission amplifier 11, to disable its source of optical pumping radiation;
a third digital operating signal $l_2$ to the said second secondary optical receiving amplifier 26, to activate its source of optical pumping radiation.

The said operating devices associated with the said first and the said second secondary optical receiving amplifier 23 and 26 also send, to the said second and the said first secondary optical transmission amplifier 24 and 21 respectively, digital operating signals $w_3$ and $w_4$ respectively, to activate their modulators, and send to the said first and the said second primary optical receiving amplifier 13 and 16 respectively digital operating signals $l_3$ and $l_4$ respectively, to keep their sources of optical pumping radiation, which have already been switched off, disabled.

Since both the said sources of optical pumping radiation of the said first and second secondary optical receiving amplifiers 23 and 26 and also the said modulators of the said secondary optical transmission amplifiers 21 and 24 have been activated, the transmission of the said optical signals 300 and 400 is automatically switched to the said first and second secondary guided optical paths 2 and 4 respectively, together with the said first overmodulation frequency (tone).

This is so because, since the said sources of optical pumping radiation of the said primary optical receiving amplifiers 13 and 16 have been switched off, the said optical signals 300 and 400, although transmitted by the said beam splitters 31 and 33 both along the said primary guided optical paths 1 and 3 and along the said secondary guided optical paths 2 and 4, are actually transmitted only along the said secondary guided optical paths 2 and 4.

On completion of the transmission switching, an operator can intervene if necessary to locate and repair the fault in the said primary guided optical path 1. At this point, in case of a fault in one of the said secondary guided optical paths 2 and 4, the transmission can be switched again, in a similar way, to the said primary guided optical paths 1 and 3.

In general, in order to carry out the switching, the said operating device associated with each of the said optical receiving amplifiers 13, 16, 23 and 26 uses the following digital operating signals (Table 1):

a digital operating signal $w_j$, to one of the said optical transmission amplifiers 11, 14, 21 and 24, to send or not send the said first overmodulation frequency;

a digital operating signal $i_j$ to one of the said optical transmission amplifiers 11, 14, 21 and 24, to activate or disable the said source of optical pumping radiation;

a digital operating signal $l_j$ to another optical receiving amplifier, to activate or disable the said source of optical pumping radiation.

The different possible states S1–S5 of the switching system according to the invention are shown schematically in Table 2, where:

the expression "active" is used to indicate the guided optical paths along which the said optical signals 300 and 400 are actually transmitted (as stated above);

the expression "protection" is used to indicate the guided optical paths which are not used for the transmission of the said optical signals 300 and 400, but to which the transmission of the said optical signals 300 and 400 is switched in case of a fault in the active optical paths;

the expression "in service" is used to indicate the guided optical paths in which the said optical amplifiers 11, 12, 14, 15, 21, 22, 24, 25 (independently of the optical receiving amplifiers) have the said source of optical pumping radiation switched on;

the expression "out of service" is used to indicate the guided optical paths in which both the said optical transmission amplifiers 11, 14 and 21, 24 and the receiving amplifiers 13, 16 and 23, 26 have the said source of optical pumping radiation switched off.

The relationships between the different possible states of the switching system according to the invention and the optical amplifiers and the corresponding digital operating signals are shown in Tables 3–7. In these tables, the abbreviation AOT is used to mean an optical transmission amplifier, AO denotes an optical amplifier, and AOR denotes an optical receiving amplifier, and the index corresponds to the numerical reference which indicates the corresponding amplifier in the description and in the figures.

Figure 3:
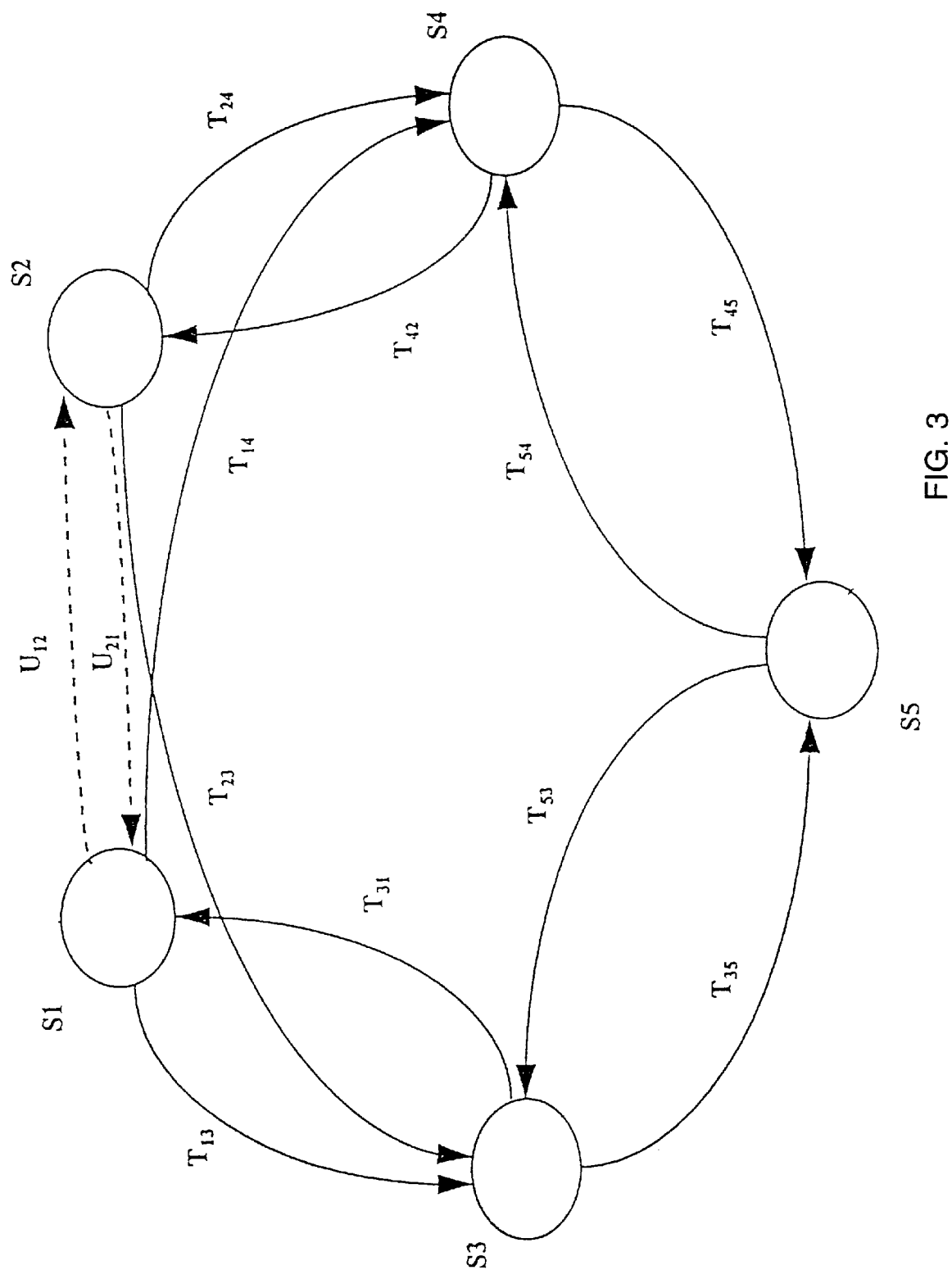
FIG. 3 is a schematic representation of the various states of a transmission switching system according to the invention and of the possible transitions between one state and the other.

Additionally, FIG. 3 shows schematically the different states of the switching system according to the invention and the possible transitions between one state and another. Table 8 shows the significance of the transitions.

To summarize, in the first embodiment, shown in FIG. 1, of the transmission switching system according to the invention, the said first overmodulation frequency is present only in the "active" optical paths; and the optical receiving amplifiers of the "protection" guided optical paths, to which the transmission is to be switched, have their sources of optical pumping radiation switched off to block the propagation of the optical signals 300 and 400 and to prevent the said optical signals 300 and 400, transmitted by the said beam splitters 31 and 33 both along the said "active" guided optical paths and along the said "protection" guided optical paths, from being recombined, by means of the said couplers 32 and 34, at the output of the said switching system. The said optical signals 300 and 400 are therefore actually transmitted only along the said "active" guided optical paths.

In the presence of a fault in an "active" guided optical path, the optical receiving amplifier of the "active" optical path in which the fault has occurred detects the absence of the said first overmodulation frequency down-line from the fault; and the transmission of the said optical signals 300 and 400 is immediately switched to both "protection" guided optical paths by means of the said digital operating signals $w_j$, $i_j$, $l_j$ associated with the said optical receiving amplifiers.

In one variant, the presence of any fault in a protection guided optical path may be detected by means of a second overmodulation frequency transmitted by the optical transmission amplifiers 11, 14, 21 and 24 of the protection guided optical path. In this case, the said modulator associated with the optical transmission amplifiers 11, 14, 21 and 24 shall be operated in such a way that it modulates the said optical pumping radiation at the said first overmodulation frequency in the "active" guided optical paths, and at the said second overmodulation frequency in the "protection" guided optical paths. The said optical receiving amplifiers will also be associated with further devices, similar to those illustrated previously, for additionally detecting the presence or absence of the said second overmodulation frequency.

The considerations mentioned in respect of the said first overmodulation frequency are also applicable to the said second overmodulation frequency, which will be different from the said first overmodulation frequency and outside the transmission band of the said optical signals 300 and 400. Preferably, it will be in the range from approximately 3 to 100 kHz. More preferably it will be in the range from approximately 5 to 50 kHz. Even more preferably it will be in the range from 5 to 20 kHz.

In case of a fault in the secondary optical path 200, for example, while this path is in a "protection" state, the said first secondary optical receiving amplifier 23 will detect the absence of the said second overmodulation frequency downline from the fault and will send the said digital operating signals $w_3$ and $i_3$ to disable the said modulator and the said source of optical pumping radiation of the said second secondary optical transmission amplifier 24. In turn, the said second secondary optical receiving amplifier 26 will detect the absence of the said second overmodulation frequency in the said second secondary guided optical path 4 and will send the said digital operating signals $w_4$ and $i_4$ to disable the said modulator and the said source of optical pumping radiation of the said first secondary optical transmission amplifier 21. At this point, an operator can intervene if necessary to locate and repair the fault.

Figure 2:
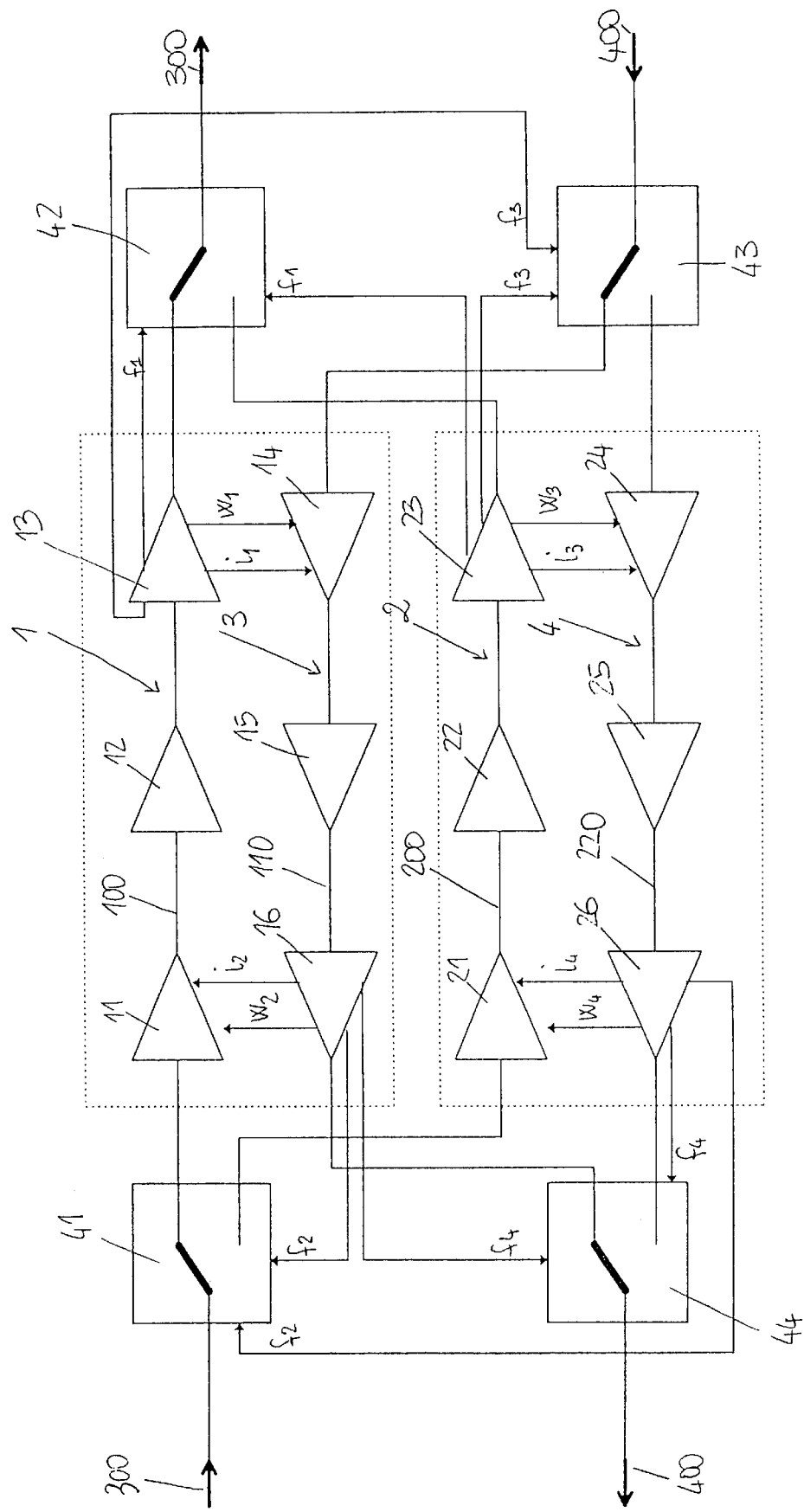
FIG. 2 is a schematic representation of a second embodiment of a transmission switching system according to the invention.

The second embodiment of the invention shown in FIG. 2 differs from the first embodiment in that the said first and second beam splitters 31 and 33 and the said first and second couplers 32 and 34 are replaced by a first switch 41, a third switch 43, a second switch 42 and a fourth switch 44 respectively. The said switches are optical, of the optomechanical type for example, and are operated by suitable electrical operating signals.

The introduction of the said switches
- makes it possible to transmit the said optical signals 300 and 400 either along the said first and second primary guided optical paths 1 and 3 only, or along the said first and second secondary guided optical paths 2 and 4 only;
- makes it possible to keep the optical receiving amplifiers of the protection guided optical path switched on;
- eliminates the necessity of the said digital signals $l_j$ for activating the said source of optical pumping radiation of the protection optical receiving amplifiers and for disabling the said source of optical pumping radiation of the active optical receiving amplifiers;
- makes it necessary to have new digital operating signals to cause the closing of the switches in the primary guided optical paths 1 and 3 or in the secondary guided optical paths 2 and 4.

The said operating devices associated with the said first primary optical receiving amplifier 13 and with the said first secondary optical receiving amplifier 23 must therefore send a digital operating signal $f_1$ to cause the closing of the said second switch 42 either at the output of the said first primary guided optical path 1 or at the output of the said first secondary guided optical path 2. They must also send a digital operating signal $f_3$ to cause the closing of the said third switch 43 either at the input of the said second primary guided optical path 3 or at the input of the said second secondary guided optical path 4.

In turn, the said operating devices associated with the said second primary optical receiving amplifier 16 and of the said second secondary optical receiving amplifier 26 must send a digital operating signal $f_4$ to cause the closing of the said fourth switch 44 either at the output of the said second primary guided optical path 3 or at the output of the said second secondary guided optical path 4. They must also send a digital operating signal $f_2$ to cause the closing of the said first switch 41 either at the input of the said first primary guided optical path 1 or at the input of the said first secondary guided optical path 2.

With the exception of the aforesaid differences, the description and comments provided in relation to the said first embodiment of the invention are also applicable to the second embodiment.

In both embodiments of the invention, the total time of one transmission switching may be less than approximately 50 ms. Advantageously, it is less than 20 ms.

Figure 4:
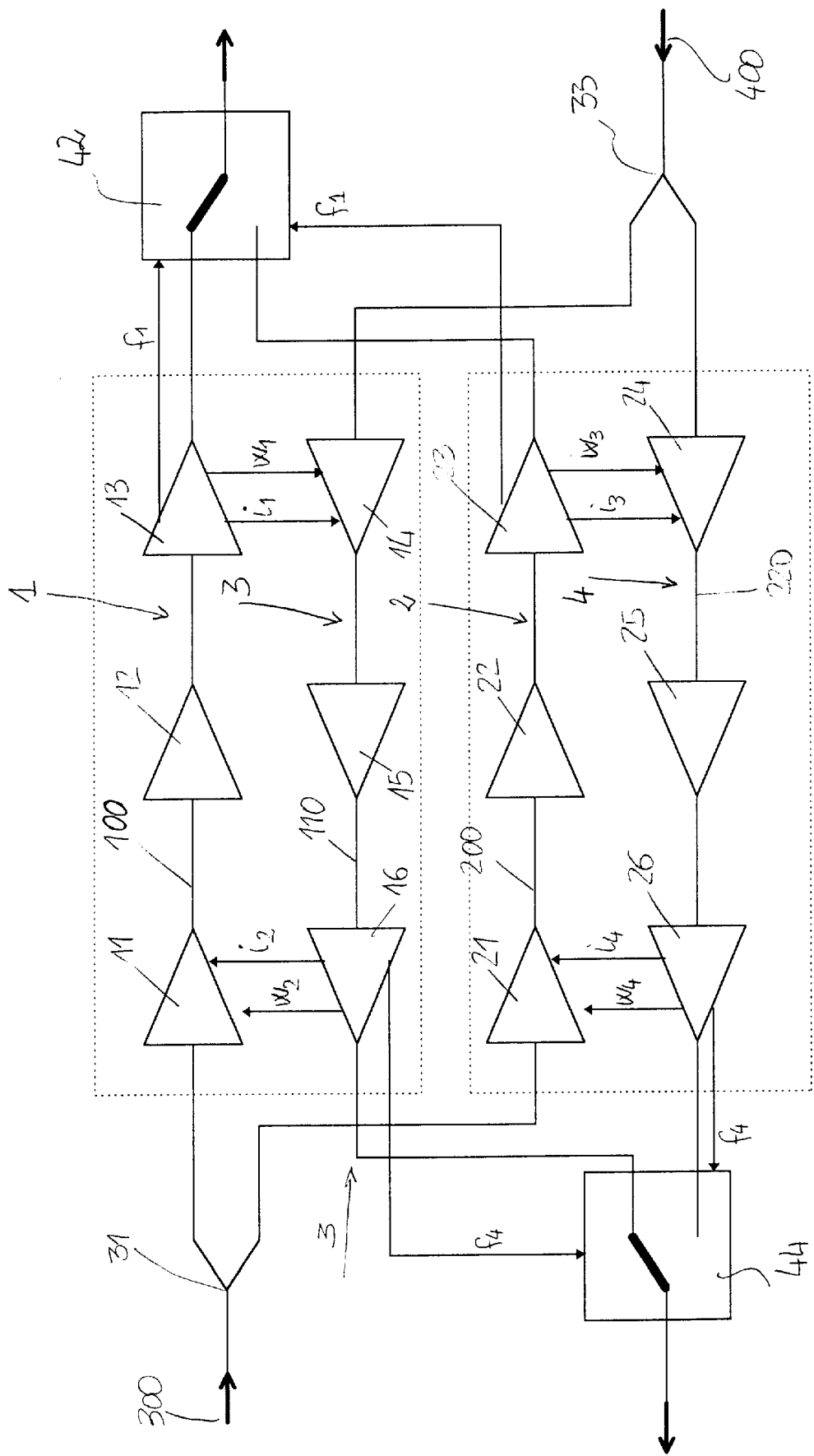
FIG. 4 is a schematic representation of a third embodiment of a transmission switching system according to the invention.

According to a third embodiment shown in FIG. 4, the optical switching system according to the invention comprises two beam splitters 31 and 33 and two switches 42 and 44. The beam splitter 31 divides the power of the said outgoing optical signal 300 to transmit it both in the said first primary guided optical path 1 and in the said first secondary guided optical path 2, while the beam splitter 33 divides the power of the said return optical signal 400 to transmit it both in the said second primary guided optical path 3 and in the said second secondary guided optical path 4. The switches 42 and 44, however, are closed, respectively, at the output of the said first primary guided optical path 1 or of the said first secondary guided optical path 2 and at the output of the said second primary guided optical path 3 or of the said second secondary guided optical path 4, according to whether the transmission of the signal takes place in the primary guided optical paths 1 and 3 or in the secondary guided optical paths 2 and 4. In other words, in normal operating conditions, the switches 42 and 44 are closed at the output of the active guided optical paths so that they can subsequently switch, in case of a fault, to the output of the protection guided optical paths.

In a similar way to that of the first and second embodiments, the presence of any fault in an active guided optical path is detected by means of a device which detects the presence or absence of an overmodulation frequency along the active guided optical paths. When the absence of the said overmodulation frequency is detected, electronic operating devices associated with the optical receiving amplifiers 13, 16, 23 and 26 cause the closing of the said switches 42 and 44 on the protection guided optical paths.

Figure 5:
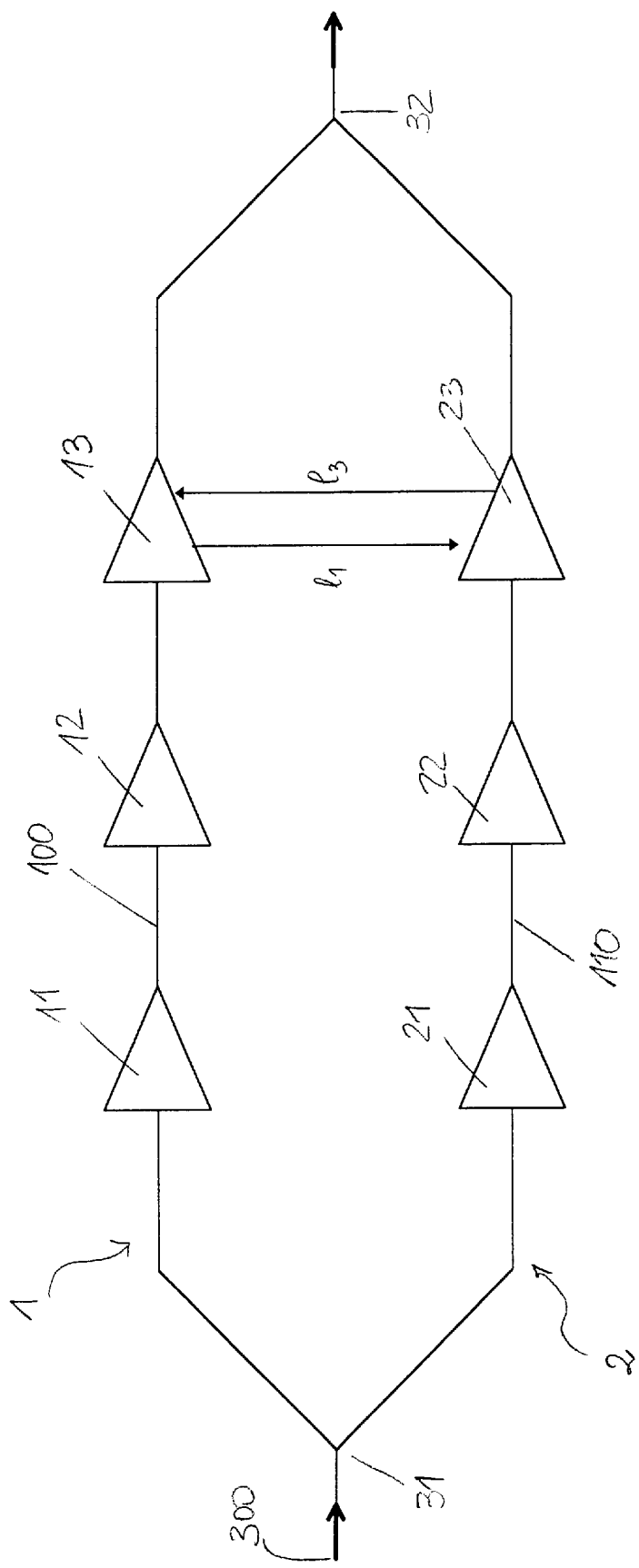
FIG. 5 is a schematic representation of a fourth embodiment of a transmission switching system according to the invention.

The fourth embodiment of the invention, shown in FIG. 5, differs from the first embodiment shown in FIG. 1 in that it relates to a transmission switching system for a unidirectional optical communication system.

The transmission switching system shown in FIG. 5 comprises a conventional transmitter (not shown) for sending an optical signal 300 having a predetermined carrier wavelength, a conventional receiver (not shown), a beam splitter 31, a coupler 32, a primary guided optical path 1 and a secondary guided optical path 2.

In normal operating conditions, the optical signal 300 is actually transmitted, as stated previously, along the said primary guided optical path 1 while, in case of a fault along the said primary guided optical path 1, the transmission of the said optical signal 300 is switched to the said secondary guided optical path 2.

In a similar way to that of the first embodiment, the presence of any fault along the primary guided optical path 1 is detected by means of a device, associated with a primary optical receiving amplifier 13, which detects the absence or the presence of an overmodulation frequency along the said primary guided optical path 1. Until the presence of the said overmodulation frequency is detected, a secondary optical receiving amplifier 23 is kept switched off to block the propagation of the signal in the said secondary guided optical path 2. However, when the absence of the said overmodulation frequency is detected, an electronic operating device, associated with the primary optical receiving amplifier 13, prepares for the disabling of the said receiving amplifier 13 and sends to the said secondary optical receiving amplifier 23 a digital operating signal 1, to activate its source of optical radiation which has been disabled up to this moment. In this way, the optical signal 300 is propagated up to the said receiver along the secondary guided optical path 2, thus making it possible to obtain automatic switching of its transmission.

In this embodiment, the additional switching to the secondary guided optical path 2 of the transmission of the first overmodulation frequency can be carried out by means of a suitable system of telemetry, for example.

Alternatively, in a similar way to that of the third embodiment shown in FIG. 4, the transmission switching system shown in FIG. 5 may comprise, in place of the coupler 32, a switch 42 for switching the transmission of the signal 300 from the active guided optical path to the protection guided optical path.

In case of a fault in a guided optical path, the optical switching system according to the invention therefore permits a fast switching of the transmission of an optical signal to another guided optical path independently of the transmitting and receiving apparatus and of the location of this fault. The switching is carried out exclusively by means of the said modulator associated with the said optical transmission amplifiers and by means of the said devices for detecting the absence of the said first overmodulation frequency and of the said digital operating signals associated with the said optical receiving amplifiers.

The fault may be located, independently, by a conventional remote monitoring system of an optical communication system, for example by means of the appropriate service signals transmitted by the transmitting and receiving apparatus along the said guided optical paths.

The transmission switching time is also independent of the presence and number of the amplifiers 12, 15, 22 and 25 along the guided optical paths, since the speed of transmission of the fault information coincides with the speed of propagation of the optical signals 300 and 400, in other words the speed of light in the transmission medium.

In the case of a multiple wavelength transmission (WDM), in which a plurality of signals at different wavelengths are transmitted in each of the said primary guided optical paths 1 and 3, the optical switching system according to the invention also makes it possible to carry out switching, in case of a fault along a guided optical path, of all the signals at different wavelengths to the said secondary guided optical paths 2 and 4. This eliminates the necessity, present in conventional systems of operating an optical communication system, of switching these signals at different wavelengths with a number of switching systems equal to that of the different wavelengths transmitted.

TABLE 1

Digital operating signals of optical receiving amplifiers for carrying out switching

| SIGNAL | STATE | COMMAND |
|---|---|---|
| $w_1$ | active/disabled | request for activation/disabling of the first overmodulation frequency from $AOR_{13}$ to $AOT_{14}$. |
| $w_2$ | active/disabled | request for activation/disabling of the first overmodulation frequency from $AOR_{16}$ to $AOT_{11}$. |
| $w_3$ | active/disabled | request for activation/disabling of the first overmodulation frequency from $AOR_{23}$ to $AOT_{24}$. |
| $w_4$ | active/disabled | request for activation/disabling of the first overmodulation frequency from $AOR_{26}$ to $AOT_{21}$. |
| $i_1$ | active/disabled | request for activation/disabling of the source of optical pumping radiation from $AOR_{13}$ to $AOT_{14}$. |
| $i_2$ | active/disabled | request for activation/disabling of the source of optical pumping radiation from $AOR_{16}$ to $AOT_{11}$. |

TABLE 1-continued

Digital operating signals of optical receiving amplifiers for carrying out switching

| SIGNAL | STATE | COMMAND |
|---|---|---|
| $i_3$ | active/disabled | request for activation/disabling of the source of optical pumping radiation from $AOR_{23}$ to $AOT_{24}$. |
| $i_4$ | active/disabled | request for activation/disabling of the source of optical pumping radiation from $AOR_{26}$ to $AOT_{21}$. |
| $l_1$ | active/disabled | request for activation/disabling of the source of optical pumping radiation from $AOR_{13}$ to $AOR_{23}$. |
| $l_2$ | active/disabled | request for activation/disabling of the source of optical pumping radiation from $AOR_{16}$ to $AOR_{26}$. |
| $l_3$ | active/disabled | request for activation/disabling of the source of optical pumping radiation from $AOR_{23}$ to $AOR_{13}$. |
| $l_4$ | active/disabled | request for activation/disabling of the source of optical pumping radiation from $AOR_{26}$ to $AOR_{16}$. | where:
AOR = Optical receiving amplifier
AOT = Optical transmission amplifier

TABLE 2

Diagram of the states shown in FIG. 3 for the optical switching system according to the invention

| STATE | OPTICAL PATH | OPERATING STATE | TRANSMISSION STATE |
|---|---|---|---|
| S1 | P | IS | AT |
|    | S | IS | PR |
| S2 | P | IS | PR |
|    | S | IS | AT |
| S3 | P | IS | AT |
|    | S | FS | PR |
| S4 | P | FS | PR |
|    | S | IS | AT |
| S5 | P | FS | // |
|    | S | FS | // | where:
P = Primary
S = Secondary
IS = In Service
FS = Out of Service
AT = Active
PR = Protection

TABLE 3

Relationship between the state S1 of the switching system according to the invention and the states of the optical amplifiers and of the corresponding digital operating signals

| Primary optical path 1 | $AOT_{11}$ | On |
|---|---|---|
|  | $AO_{12}$ | On |
|  | $AOR_{13}$ | On |
|  | $w_1$ | Active |
|  | $i_1$ | Active |
|  | $l_1$ | Disabled |
| Primary optical path 3 | $AOT_{14}$ | On |
|  | $AO_{15}$ | On |
|  | $AOR_{16}$ | On |
|  | $w_2$ | Active |
|  | $i_2$ | Active |
|  | $l_2$ | Disabled |
| Secondary optical path 2 | $AOT_{21}$ | On |
|  | $AO_{22}$ | On |
|  | $AOR_{23}$ | Off |

TABLE 3-continued

Relationship between the state S1 of the switching system according to the invention and the states of the optical amplifiers and of the corresponding digital operating signals

|  |  |  |
|---|---|---|
|  | $w_3$ | Disabled |
|  | $i_3$ | Active |
|  | $l_3$ | Active |
| Secondary optical path 4 | $AOT_{24}$ | On |
|  | $AO_{25}$ | On |
|  | $AOR_{26}$ | Off |
|  | $w_4$ | Disabled |
|  | $i_4$ | Active |
|  | $l_4$ | Active |

TABLE 4

Relationship between the state S2 of the switching system according to the invention and the states of the optical amplifiers and of the corresponding digital operating signals

| Primary optical path 1 | $AOT_{11}$ | On |
|---|---|---|
|  | $AO_{12}$ | On |
|  | $AOR_{13}$ | Off |
|  | $w_1$ | Disabled |
|  | $i_1$ | Active |
|  | $l_1$ | Active |
| Primary optical path 3 | $AOT_{14}$ | On |
|  | $AO_{15}$ | On |
|  | $AOR_{16}$ | Off |
|  | $w_2$ | Disabled |
|  | $i_2$ | Active |
|  | $l_2$ | Active |
| Secondary optical path 2 | $AOT_{21}$ | On |
|  | $AO_{22}$ | On |
|  | $AOR_{23}$ | On |
|  | $w_3$ | Active |
|  | $i_3$ | Active |
|  | $l_3$ | Disabled |
| Secondary optical path 4 | $AOT_{24}$ | On |
|  | $AO_{25}$ | On |
|  | $AOR_{26}$ | On |
|  | $w_4$ | Active |
|  | $i_4$ | Active |
|  | $l_4$ | Disabled |

TABLE 5

Relationship between the state S3 of the switching system according to the invention and the states of the optical amplifiers and of the corresponding digital operating signals

| Primary optical path 1 | $AOT_{11}$ | On |
|---|---|---|
|  | $AO_{12}$ | On |
|  | $AOR_{13}$ | On |
|  | $w_1$ | Active |
|  | $i_1$ | Active |
|  | $l_1$ | Disabled |
| Primary optical path 3 | $AOT_{14}$ | On |
|  | $AO_{15}$ | On |
|  | $AOR_{16}$ | On |
|  | $w_2$ | Active |
|  | $i_2$ | Active |
|  | $l_2$ | Disabled |
| Secondary optical path 2 | $AOT_{21}$ | Off |
|  | $AO_{22}$ | Off |
|  | $AOR_{23}$ | Off |
|  | $w_3$ | Disabled |
|  | $i_3$ | Disabled |
|  | $l_3$ | Active |

TABLE 5-continued

Relationship between the state S3 of the switching system according to the invention and the states of the optical amplifiers and of the corresponding digital operating signals

| Secondary optical path 4 | $AOT_{24}$ | Off |
|---|---|---|
|  | $AO_{25}$ | Off |
|  | $AOR_{26}$ | Off |
|  | $w_4$ | Disabled |
|  | $i_4$ | Disabled |
|  | $l_4$ | Active |

TABLE 6

Relationship between the state S4 of the switching system according to the invention and the states of the optical amplifiers and of the corresponding digital operating signals

| Primary optical path 1 | $AOT_{11}$ | Off |
|---|---|---|
|  | $AO_{12}$ | Off |
|  | $AOR_{13}$ | Off |
|  | $w_1$ | Disabled |
|  | $i_1$ | Disabled |
|  | $l_1$ | Active |
| Primary optical path 3 | $AOT_{14}$ | Off |
|  | $AO_{15}$ | Off |
|  | $AOR_{16}$ | Off |
|  | $w_2$ | Disabled |
|  | $i_2$ | Disabled |
|  | $l_2$ | Active |
| Secondary optical path 2 | $AOT_{21}$ | On |
|  | $AO_{22}$ | On |
|  | $AOR_{23}$ | On |
|  | $w_3$ | Active |
|  | $i_3$ | Active |
|  | $l_3$ | Disabled |
| Secondary optical path 4 | $AOT_{24}$ | On |
|  | $AO_{25}$ | On |
|  | $AOR_{26}$ | On |
|  | $w_4$ | Active |
|  | $i_4$ | Active |
|  | $l_4$ | Disabled |

TABLE 7

Relationship between the state S5 of the switching system according to the invention and the states of the optical amplifiers and of the corresponding digital operating signals

| Primary optical path 1 | $AOT_{11}$ | Off |
|---|---|---|
|  | $AO_{12}$ | Off |
|  | $AOR_{13}$ | Off |
|  | $w_1$ | Disabled |
|  | $i_1$ | Disabled |
|  | $l_1$ | Disabled |
| Primary optical path 3 | $AOT_{14}$ | Off |
|  | $AO_{15}$ | Off |
|  | $AOR_{16}$ | Off |
|  | $w_2$ | Disabled |
|  | $i_2$ | Disabled |
|  | $l_2$ | Disabled |
| Secondary optical path 2 | $AOT_{21}$ | Off |
|  | $AO_{22}$ | Off |
|  | $AOR_{23}$ | Off |
|  | $w_3$ | Disabled |
|  | $i_3$ | Disabled |
|  | $l_3$ | Disabled |
| Secondary optical path 4 | $AOT_{24}$ | Off |
|  | $AO_{25}$ | Off |
|  | $AOR_{26}$ | Off |
|  | $w_4$ | Disabled |
|  | $i_4$ | Disabled |
|  | $l_4$ | Disabled |

TABLE 8

Transitions shown in FIG. 3 between the different states of the optical switching system according to the invention

| TRANSITION | CAUSES OF TRANSITION | EFFECT |
| --- | --- | --- |
| $T_{13}$ | Fault in the S/PR optical path. | There is no switching and the S optical path goes FS. |
| $T_{31}$ | The S/PR optical path is restored by external command. | There is no switching and the S optical path returns to the IS state. |
| $T_{35}$ | Fault in the P/AT optical path when the S/PR optical path was already FS. | The switching system is no longer operative. |
| $T_{53}$ | Restoration of the P/AT optical path by external command. | Transmission is possible again. The first path to be reset becomes active. |
| $T_{45}$ | Fault in the S/AT optical path when the P/PR path was already FS. | The switching system is no longer operative. |
| $T_{54}$ | Restoration of the S/AT optical path by external command. | Transmission is possible again. The first path to be reset becomes active. |
| $T_{42}$ | Restoration of the P/PR optical path by external command. | There is no switching. The P path returns to the IS state in PR. To return to being P/AT an external command is required. |
| $T_{24}$ | Fault in the P/PR optical path. | There is no switching. The P/PR optical path goes FS. |
| $T_{14}$ | Fault in the P/AT optical path. | Switching takes place. The S optical path becomes AT and the P path goes FS. |
| $T_{23}$ | Fault in the S/AT optical path. | Switching takes place. The P optical path becomes AT and the S path goes FS. |
| $U_{12}$ | Forced switching from outside. | Switching takes place. The S optical path becomes AT and the P path becomes PR. |
| $U_{21}$ | Forced switching from outside. | Switching takes place. The P optical path becomes AT and the S path becomes PR. |
| $A_1$ | Switching system switched on when the optical signal arrives and all paths are IS. | The AOR of the P guided optical paths takes priority over that of the S guided optical paths, and therefore becomes AT. |
| $A_2$ | Switching system switched on in the absence of an optical signal and when all paths are FS. | Both the P and the S optical paths are FS. Those which are restored first will become AT. | where:
P/AT = Active primary path
P/PR = Protection primary path
S/AT = Active secondary path
S/PR = Protection secondary path
IS = inservice
FS = Out of service

What is claimed is:

1. An optical communication system for communicating at least a first optical signal comprising:
 a first primary guided optical path through which the first optical signal is configured to propagate;
 a first secondary guided optical path through which the first optical signal is configured to propagate;
 a first primary optical amplifier provided in the first primary guided optical path and configured to transmit an overmodulation frequency of the first optical signal;
 a first secondary optical amplifier provided in the first secondary guided optical path and configured to transmit the overmodulation frequency of the first optical signal; and
 a control configured to control and switch propagation of the first optical signal from the first primary guided optical path to the first secondary guided optical path based on a detected presence of the overmodulation frequency.

2. An optical communication system according to claim 1, wherein the optical communication system further communicates a second optical signal, and further comprising:
 a first secondary guided optical path through which the second optical signal is configured to propagate;
 a second secondary guided optical path through which the second optical signal is configured to propagate;
 a second primary optical amplifier provided in the second primary guided optical path and configured to transmit, at a third predetermined command, a second overmodulation frequency of the second optical signal;
 a second secondary optical amplifier provided in the second secondary guided optical path and configured to transmit, at a fourth predetermined command, the second overmodulation frequency of the second optical signal; and
 wherein the control is further configured to control and switch propagation of the second optical signal from the second primary guided optical path to the second secondary guided optical path based on a detected presence of the second overmodulation frequency.

3. An optical communication system according to claim 2, wherein the second optical signal has a propagation direction opposite to that of the first optical signal.

4. An optical communication system according to claim 3, further comprising a first beam splitter at an input of the first primary guided optical path and the first secondary guided optical path to divide the first optical signal between the first primary guided optical path and the first secondary guided optical path.

5. An optical communication system according to claim 4, wherein the control comprises a first switch at an output of the first primary optical amplifier and the first secondary optical amplifier for switching between outputting the first optical signal from the first primary optical amplifier or from the first secondary optical amplifier based on the detected presence of the overmodulation frequency.

6. An optical communication system according to claim 4, further comprising a second beam splitter at an input of the second primary guided optical path and the second secondary guided optical path to divide the second optical signal between the second primary guided optical path and the second secondary guided optical path.

7. An optical communication system according to claim 6, wherein the control comprises a second switch at an output of the second primary optical amplifier and the second secondary optical amplifier for switching between outputting the second optical signal from the second primary optical amplifier or from the second secondary optical amplifier based on the detected presence of the second overmodulation frequency.

8. An optical communication system according to claim 3, wherein the control comprises a first primary receiving amplifier in the first primary guided optical path connected to an output of the first primary optical amplifier and a first secondary receiving amplifier in the first secondary guided optical path connected to an output of the first secondary optical amplifier, and wherein the first primary receiving amplifier and the first secondary receiving amplifier are configured to be disabled by control signals based on the detected presence of the overmodulation frequency.

9. An optical communication system according to claim 8, wherein the control comprises a second primary receiving amplifier in the second primary guided optical path connected to an output of the second primary optical amplifier and a second secondary receiving amplifier in the second secondary guided optical path connected to an output of the second secondary optical amplifier, and wherein the second primary receiving amplifier and the second secondary receiving amplifier are configured to be disabled by control signals based on the detected presence of the second overmodulation frequency.

10. An optical communication system according to claim 3, further comprising a first optical coupler at an output of the first primary guided optical path and the first secondary guided optical path.

11. An optical communication system according to claim 10, further comprising a second optical coupler at an output of the second primary guided optical path and the second secondary guided optical path.

12. An optical communication system according to claim 3, wherein the control comprises a first switch at an output of the first primary guided optical path and the first secondary guided optical path for switching between outputting the first optical signal from the first primary guided optical path or from the first secondary guided optical path based on the detected presence of the overmodulation frequency.

13. An optical communication system according to claim 12, wherein the control comprises a second switch at an input of the first primary optical amplifier and the first secondary optical amplifier for switching between inputting the first optical signal to the first primary optical amplifier or to the first secondary optical amplifier based on the detected presence of the overmodulation frequency.

14. An optical communication system according to claim 12, wherein the control comprises a second switch at an output of the second primary guided optical path and the second secondary guided optical path for switching between outputting the second optical signal from the second primary guided optical path or from the second secondary guided optical path based on the detected presence of the second overmodulation frequency.

15. An optical communication system according to claim 14, wherein the control comprises a third switch at an input of the first primary optical amplifier and the first secondary optical amplifier for switching between inputting the first optical signal to the first primary optical amplifier or to the first secondary optical amplifier based on the detected presence of the first overmodulation frequency.

16. An optical communication system according to claim 15, wherein the control comprises a fourth switch at an input of the second primary optical amplifier and the second secondary optical amplifier for switching between inputting the second optical signal to the second primary optical amplifier or to the second secondary optical amplifier based on the detected presence of the second overmodulation frequency.

17. An optical communication system according to claim 1, wherein the control comprises a first primary receiving amplifier in the first primary guided optical path connected to an output of the first primary optical amplifier and a first secondary receiving amplifier in the first secondary guided optical path connected to an output of the first secondary optical amplifier, and wherein the first primary receiving amplifier and the first secondary receiving amplifier are configured to be disabled by control signals based on the detected presence of the overmodulation frequency.

18. An optical communication system according to claim 1, further comprising an optical coupler at an output of the first primary guided optical path and the first secondary guided optical path.

19. An optical communication system according to claim 1, wherein the control comprises a first switch at an output of the first primary guided optical path and the first secondary guided optical path for switching between outputting the first optical signal from the first primary guided optical path or from the first secondary guided optical path based on the detected presence of the overmodulation frequency.

20. An optical communication system according to claim 19, wherein the control comprises a second switch at an input of the first primary optical amplifier and the first secondary optical amplifier for switching between inputting the first optical signal to the first primary optical amplifier or to the first secondary optical amplifier based on the detected presence of the overmodulation frequency.

* * * * *